C. W. McKINNEY.
TOOTH CLEANING IMPLEMENT.
APPLICATION FILED AUG. 31, 1915.
1,213,667.
Patented Jan. 23, 1917.
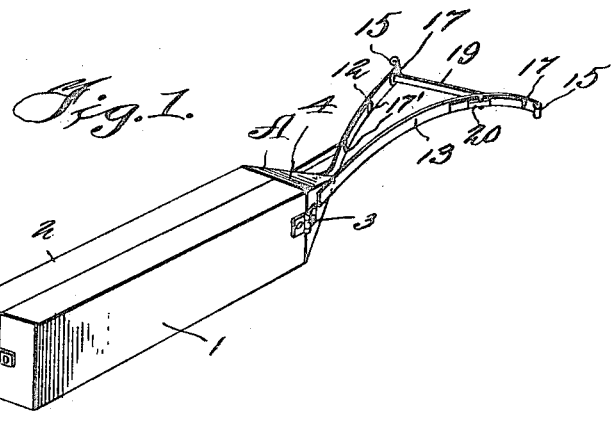
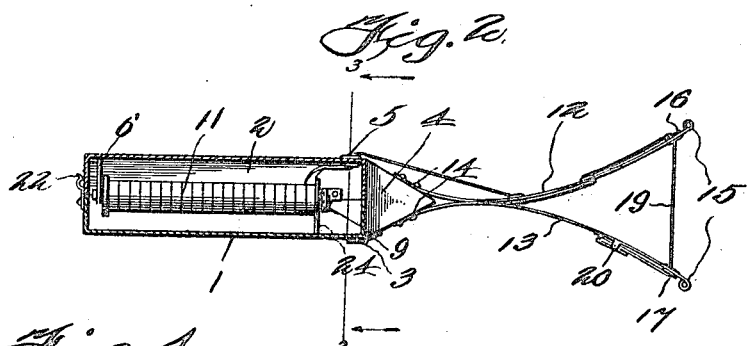
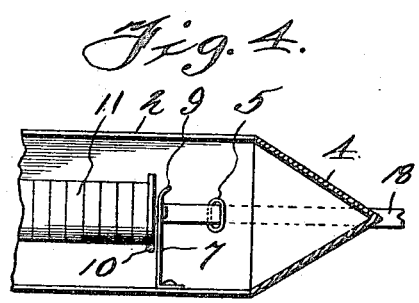 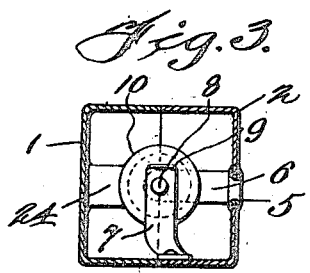
Witnesses
Inventor
C. W. McKinney,
By
Attorney

UNITED STATES PATENT OFFICE.

CALEB W. McKINNEY, OF FRESNO, CALIFORNIA.

TOOTH-CLEANING IMPLEMENT.

1,213,667. Specification of Letters Patent. Patented Jan. 23, 1917.

Application filed August 31, 1915. Serial No. 48,321.

*To all whom it may concern:*

Be it known that I, CALEB W. MCKINNEY, a citizen of the United States, residing at Fresno, in the county of Fresno and State of California, have invented certain new and useful Improvements in Tooth-Cleaning Implements; and I do hereby declare the following to be a full, clear, and exact description of the invention, such as will enable others skilled in the art to which it appertains to make and use the same.

The primary object of this invention is to provide a tooth cleaning implement, which can be conveniently inserted in the spaces between the teeth, so as to remove any matter collected therein, and to admit of a more thorough cleaning of the teeth, without danger of irritating the gum tissue.

Another object of the invention is to provide a cleaning implement, for carrying out the above objects, which can be manufactured cheaply, will be sanitary and easily manipulated.

Other objects will appear and be better understood from that embodiment of my invention, of which the following is a specification, reference being had to the accompanying drawings forming a part thereof, in which:—

Figure 1 is a perspective view of the implement, Fig. 2 is a longitudinal section therethrough, Fig. 3 is a detail sectional view through a portion of the implement, showing one of the bearings for the tape-holding reel, and Fig. 4 is a transverse sectional view on the line 3—3 of Fig. 2.

Referring to the drawings, the letter A designates the tooth cleaning implement, as an entirety, which implement consists of a casing formed of companion rectangular sections 1 and 2, the section 1 being hinged, as at 3, to the base of a pyramidal end piece 4, carried by the forward end of the section 2. One end of the section 2 is provided, at a point adjacent the pyramidal end piece, with an opening which receives a substantially oval-shaped eyelet 5, and said side of the section 2 is provided, adjacent its opposite end, with a laterally and inwardly extending bearing member 6. The lower wall of the section 2, is provided with a vertically disposed bearing 7, the said last mentioned bearing being formed of spring steel and has an opening 8 therein registering with a similar opening in the inner end of the bearing member 6, and the upper end of the bearing 7 is deflected, as shown at 9, so as to provide a manipulating member by means of which the bearing can be flexed. The bearings 6 and 7 removably receive trunnions formed on the opposite ends of a reel 10, upon which reel is wound flat and preferably medicated tape 11.

Associated with the forward end of the casing, is a pair of oppositely bowed tape holding members 12 and 13. These holding members are arranged on opposite faces of the pyramidal end piece 4, and the said members each have one end secured to the adjacent face of the pyramidal member by means of fastening elements 14. The opposite ends of the members extend in diverging relation, a considerable distance beyond the apex of the pyramidal shaped end piece 4, and each has its free terminal rolled, as shown at 15. The tape holding member 12 is provided with a plurality of spaced eyelets 16, and each of the holding members is provided adjacent the rolled terminal with an eyelet 17, the said eyelet 17 being located directly opposite and in alinement with each other.

One end of the tape 11 is adapted, as shown in Figs. 1 and 2, to be threaded through the eyelet 5 and then through the eyelet 16 in the holding member 12 and then passed through the registering terminal eyelet 17 in the holding members 12 and 13, to provide a cleaning portion 19, adapted to be inserted in the spaces between the teeth, and the terminal of the mentioned end of the tape being then extended rearwardly and in close relation with the adjacent side of the holding member 13 and anchored by means of a spring clasp 20, carried by the said adjacent side of the member 13.

The rear end of the section 1, is provided with a spring clasp 21, which when the sections are in closed position, shown most clearly in Figs. 1 and 2, engage over a projection or lug 22 carried by the adjacent end of the section 2.

The side wall of the section 1 has projecting laterally and inwardly therefrom, a finger 24, which, as shown in Fig. 2, engages against one end of the reel 10, when the sections are in closed position, and prevents the reel from rotating, so as to hold the tape taut during the cleaning operation.

In use, the portion 19 of the tape, which is extended between the forward end of the holding members 12 and 13, is inserted within the space between the adjacent teeth, and the implement is given horizontal reciprocatory movement, drawing the tape through the space and scraping against the adjacent sides of the teeth, resulting in the removal of any matter on the teeth or collected within the space between the adjacent teeth. After the portion of the tape that has been in service becomes soiled, the section 1 of the casing is moved outwardly a short distance, so as to disengage the finger 24 from the reel, and the free end of the tape released from the clasp 20, after which the tape can be drawn through the eyelets and present a clean portion between the holding members 12 and 13, so as to further carry out the cleaning operation.

Having thus described my invention, what I claim as new is:—

A tooth cleaning tape holder comprising a substantially rectangular casing formed of hinged sections, one of said sections carrying a pair of spaced bearings, a tape carrying reel journaled in said bearings, a finger carried by the other section adjacent one of said bearings and adapted to engage said reel to prevent the rotation thereof, a pyramidal shaped end piece carried by one end of said casing, a pair of oppositely bowed members secured to the slanting opposite faces of said end piece, the section carrying said bearings having an opening arranged therein adjacent one of said bearings and through which the tape passes, one of said bow members adjacent said opening having a plurality of openings through which the tape is threaded, the other of said bow members having an eyelet adjacent the free end thereof in alinement with the outermost opening in the other member, and a spring clasp carried by said member to engage the free end of the tape after it is threaded through the last named opening.

In testimony whereof I affix my signature in presence of two witnesses.

CALEB W. McKINNEY.

Witnesses:
M. A. McCARTHY,
W. P. THOMPSON.

Copies of this patent may be obtained for five cents each, by addressing the "Commissioner of Patents, Washington, D. C."